UNITED STATES PATENT OFFICE.

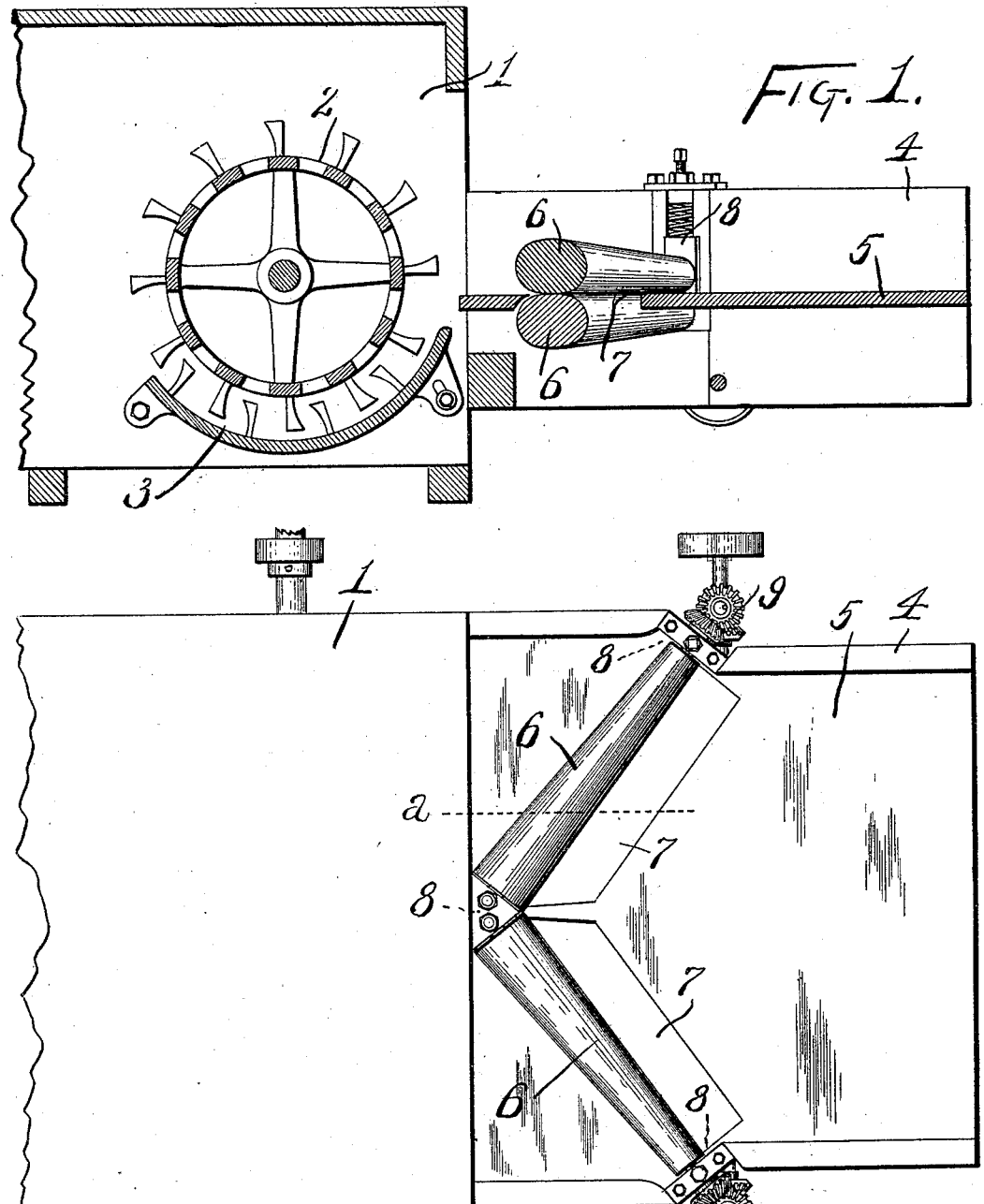

ELDER F. OBENCHAIN, OF LOGANSPORT, INDIANA.

CORN-HUSKING MACHINE.

SPECIFICATION forming part of Letters Patent No. 671,653, dated April 9, 1901.

Application filed February 11, 1901. Serial No. 46,838. (No model.)

*To all whom it may concern:*

Be it known that I, ELDER F. OBENCHAIN, a citizen of the United States, residing at Logansport, Cass county, Indiana, (post-office address Logansport, Cass county, Indiana,) have invented certain new and useful Improvements in Corn-Husking Machines, of which the following is a specification.

This invention pertains to improvements in the snapping-rolls of corn-husking machines, and the invention will be readily understood from the following description, taken in connection with the accompanying drawings, in which—
Figure 1 is a vertical longitudinal section of the machine in the plane of line *a* of Fig. 2, and Fig. 2 a plan of the same.

In the drawings, 1 indicates the receiving end of the shredder part of the machine, 2 the shredding-cylinder, 3 the concave, and 4 the feed-table extension, the parts thus far referred to being of the usual construction and arrangement; 5, the feed-table, disposed, as usual, forward of the shredding-cylinder; 6, the snapping-rolls, disposed across the machine between the shredding-cylinder and the rear edge of the feed-table, the joint between the rolls being at about the level of the feed-table, there being four of these rolls arranged in two pairs, each pair consisting of one roll disposed above another, and the two pairs being disposed angularly across the machine, with their inner ends contiguous and farther toward the shredding-cylinder than the outer ends, the rolls being preferably tapering, their larger ends being inward; 7, openings formed at the rear edge of the feed-table just in front of the snapping-rolls and leading downward through the feed-table; 8, spring-pressed boxes for one of the rolls of each of the side pairs, preferably the top rolls, and 9 driving apparatus and transmitting-gearing for imparting rotary motion to the snapping-rolls.
The stalks, with the attached ears, are laid upon the feed-table, as usual, and presented to the snapping-rolls, which grasp them and feed them onward to the cylinder and concave, which shreds the stalks and fodder. The ears become arrested at the snapping-rolls and pulled from the stalks, then dropping down through the spaces 7, whence they pass in the usual manner to the husking-rolls. (Not shown.) The angular arrangement of the snapping-rolls causes the splitting of the bunches of stalks and aided by their conical form causes them to spread sidewise and become distributed with fair uniformity across the width of the machine, instead of going centrally through the snapping-rolls and causing them to open too wide and pass the ears through and permit the stalks to be received in centrally-massed condition to the cylinder and concave. The snapping-rolls may be smooth or they may, if desired, be corrugated or ribbed, as is sometimes customary in the snapping-rolls of corn-husking machines.

I claim as my invention—

1. In a corn-husking machine, the combination, substantially as set forth, of a cylinder and concave, two pairs of snapping-rolls arranged across the machine in front of the cylinder and concave at an angle with their inner ends contiguous and nearer the cylinder than their outer ends, and a feed-table disposed in front of the snapping-rolls and having its advanced edge substantially parallel with said angularly-arranged snapping-rolls and at some distance from said rolls.

2. In a corn-husking machine, the combination, substantially as set forth, of a cylinder and concave, two pairs of tapering snapping-rolls arranged across the machine in front of the cylinder and concave at an angle with the inner ends contiguous and nearer the cylinder than their outer ends, and a feed-table disposed in front of the snapping-rolls and having its advanced edge substantially parallel with said angularly-arranged snapping-rolls and at some distance from said rolls.

ELDER F. OBENCHAIN.

Witnesses:
CHAS. A. SMITH,
FRED G. SIX.